(12) United States Patent
Saroka et al.

(10) Patent No.: US 11,362,379 B2
(45) Date of Patent: Jun. 14, 2022

(54) TRANSPORTATION REFRIGERATION UNIT WITH INTEGRATED BATTERY ENCLOSURE COOLING

(71) Applicant: CARRIER CORPORATION, Palm Beach Gardens, FL (US)

(72) Inventors: Mary D. Saroka, Syracuse, NY (US); Jeffrey J. Burchill, Baldwinsville, NY (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 62 days.

(21) Appl. No.: 16/295,037

(22) Filed: Mar. 7, 2019

(65) Prior Publication Data
US 2019/0288350 A1 Sep. 19, 2019

Related U.S. Application Data

(60) Provisional application No. 62/643,324, filed on Mar. 15, 2018.

(51) Int. Cl.
*H01M 10/613* (2014.01)
*H01M 10/625* (2014.01)
(Continued)

(52) U.S. Cl.
CPC ........ *H01M 10/613* (2015.04); *B60H 1/3232* (2013.01); *F25B 27/00* (2013.01);
(Continued)

(58) Field of Classification Search
CPC .. H01M 10/613; H01M 10/625; H01M 10/63; H01M 10/6565; H01M 10/663;
(Continued)

(56) References Cited

U.S. PATENT DOCUMENTS

| 5,015,545 A | 5/1991 | Brooks |
| 5,320,190 A | 6/1994 | Naumann et al. |

(Continued)

FOREIGN PATENT DOCUMENTS

| CN | 204156059 U | 2/2015 |
| CN | 106394174 A | 2/2017 |

(Continued)

OTHER PUBLICATIONS

The Extended European Search Report for Application No. 19162985. 6-1008; Report dated Aug. 16, 2019 Report Received dated Aug. 21, 2019; 7 pages.

*Primary Examiner* — Brian R Ohara
*Assistant Examiner* — Patrick Marshall Greene
(74) *Attorney, Agent, or Firm* — Cantor Colburn LLP (57) ABSTRACT

A transportation refrigeration unit is provided. The transportation refrigeration unit comprising: a compressor configured to compress a refrigerant; a compressor motor configured to drive the compressor; an evaporator heat exchanger operatively coupled to the compressor; an energy storage device for providing power to the compressor motor; and an evaporator fan configured to provide return airflow from a return air intake and flow the return airflow over the evaporator heat exchanger, wherein the return airflow thermodynamically adjusts a temperature of the energy storage device.

20 Claims, 8 Drawing Sheets

(51) Int. Cl.
*H01M 10/63* (2014.01)
*H01M 10/6565* (2014.01)
*H01M 10/663* (2014.01)
*B60H 1/32* (2006.01)
*H01M 10/65* (2014.01)
*F25B 27/00* (2006.01)
*H01M 50/20* (2021.01)
*F25D 19/00* (2006.01)

(52) U.S. Cl.
CPC ......... *H01M 10/625* (2015.04); *H01M 10/63* (2015.04); *H01M 10/6565* (2015.04); *H01M 10/663* (2015.04); *H01M 50/20* (2021.01); *F25D 19/003* (2013.01); *H01M 10/65* (2015.04)

(58) Field of Classification Search
CPC .. H01M 2/1083; H01M 10/65; B60H 1/3232; F25B 27/00; F25D 19/003; F25D 11/003; B60P 3/20; B60K 2001/005; B60K 2001/008
See application file for complete search history.

(56) References Cited

U.S. PATENT DOCUMENTS

| | | | |
|---|---|---|---|
| 6,613,472 | B1 | 9/2003 | Watanabe |
| 7,013,659 | B2 | 3/2006 | Yoshida et al. |
| 7,152,417 | B2 | 12/2006 | Morishita et al. |
| 7,238,443 | B2 | 7/2007 | Sakakibara |
| 7,427,156 | B2 | 9/2008 | Ambrosio et al. |
| 7,531,270 | B2 | 5/2009 | Buck et al. |
| 7,654,351 | B2 | 2/2010 | Koike et al. |
| 7,733,065 | B2 | 6/2010 | Yoon et al. |
| 7,905,307 | B2 | 3/2011 | Kubota et al. |
| 8,053,100 | B2 | 11/2011 | Inoue et al. |
| 8,453,773 | B2 | 6/2013 | Hill et al. |
| 8,816,645 | B2 | 8/2014 | Dickinson et al. |
| 8,920,951 | B2 | 12/2014 | Leuthner et al. |
| 8,935,933 | B1 | 1/2015 | Koelsch |
| 9,033,078 | B2 | 5/2015 | Fillion et al. |
| 9,160,042 | B2 | 10/2015 | Fujii et al. |
| 9,246,197 | B2 | 1/2016 | Yoon |
| 9,389,007 | B1 * | 7/2016 | McKay ................. F25B 27/00 |
| 9,490,509 | B2 | 11/2016 | Achhammer et al. |
| 9,531,041 | B2 | 12/2016 | Hwang |
| 9,583,800 | B2 | 2/2017 | Hwang et al. |
| 9,660,304 | B2 | 5/2017 | Choi et al. |
| 2004/0020228 | A1 * | 2/2004 | Waldschmidt ......... F25D 19/02 62/234 |
| 2009/0071178 | A1 | 3/2009 | Major et al. |
| 2009/0249803 | A1 | 10/2009 | Suzuki et al. |
| 2010/0297486 | A1 | 11/2010 | Fujii |
| 2013/0118707 | A1 | 5/2013 | Kardos et al. |
| 2014/0342211 | A1 * | 11/2014 | Choi ....................... B60L 58/26 429/120 |
| 2015/0017492 | A1 * | 1/2015 | Takeuchi ................ B60L 1/003 429/62 |
| 2015/0101789 | A1 * | 4/2015 | Enomoto ................ B60L 50/16 165/202 |
| 2017/0047624 | A1 | 2/2017 | Gunna et al. |

FOREIGN PATENT DOCUMENTS

| | | |
|---|---|---|
| CN | 206340627 U | 7/2017 |
| DE | 102010049918 A1 | 6/2011 |
| JP | 10116635 A | 5/1998 |
| JP | 2004146237 A | 5/2004 |
| KR | 1020160068285 A | 6/2016 |

* cited by examiner

TRANSPORTATION REFRIGERATION UNIT WITH INTEGRATED BATTERY ENCLOSURE COOLING

CROSS-REFERENCE TO RELATED APPLICATIONS

This application claims the benefit of U.S. Provisional Application No. 62/643,324 filed Mar. 15, 2018, which is incorporated herein by reference in its entirety.

BACKGROUND

The subject matter disclosed herein generally relates to transportation refrigeration units, and more specifically to an apparatus and a method for powering transportation refrigeration unit with an energy storage device.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration systems, the compressor is driven by the engine shaft either through a belt drive or by a mechanical shaft-to-shaft link. In other systems, the engine of the refrigeration unit drives a generator that generates electrical power, which in-turn drives the compressor.

With current environmental trends, improvements in transportation refrigeration units are desirable particularly toward aspects of environmental impact. With environmentally friendly refrigeration units, improvements in reliability, cost, and weight reduction is also desirable.

BRIEF SUMMARY

According to one embodiment, a transportation refrigeration unit is provided. The transportation refrigeration unit comprising: a compressor configured to compress a refrigerant; a compressor motor configured to drive the compressor; an evaporator heat exchanger operatively coupled to the compressor; an energy storage device for providing power to the compressor motor; and an evaporator fan configured to provide return airflow from a return air intake and flow the return airflow over the evaporator heat exchanger, wherein the return airflow thermodynamically adjusts a temperature of the energy storage device.

In addition to one or more of the features described above, or as an alternative, further embodiments may include that a selected amount of return airflow is diverted from the return air intake to the energy storage device to thermodynamically adjust the temperature of the energy storage device.

In addition to one or more of the features described above, or as an alternative, further embodiments may include a regulating device located proximate the return air intake and configured to divert the selected amount of the return airflow to the energy storage device.

In addition to one or more of the features described above, or as an alternative, further embodiments may include that the energy storage device includes a battery system.

In addition to one or more of the features described above, or as an alternative, further embodiments may include that the selected amount of the return airflow is diverted around the energy storage device.

In addition to one or more of the features described above, or as an alternative, further embodiments may include that the selected amount of the return airflow is diverted through the energy storage device.

In addition to one or more of the features described above, or as an alternative, further embodiments may include: a barrier configured to direct the selected amount of return airflow through the energy storage device and towards the evaporator heat exchanger.

In addition to one or more of the features described above, or as an alternative, further embodiments may include that the barrier divides the energy storage device into at least two compartments.

In addition to one or more of the features described above, or as an alternative, further embodiments may include that the energy storage device includes a right-hand side and a left-hand side, and the barrier stretches from the right-hand side of the energy storage device to the left-hand side of the energy storage device.

In addition to one or more of the features described above, or as an alternative, further embodiments may include that the energy storage device includes a front side and a back side, and the barrier stretches from the front side of the energy storage device to the back side of the energy storage device.

In addition to one or more of the features described above, or as an alternative, further embodiments may include that the barrier is located upstream of the energy storage device.

In addition to one or more of the features described above, or as an alternative, further embodiments may include a flow adjustment device to adjust the selected amount of return airflow to the energy storage device using at least one of a controller and a booster fan.

In addition to one or more of the features described above, or as an alternative, further embodiments may include: a heating element located in an airflow path of the selected amount of the return airflow being diverted from the regulating device.

According to another embodiment, a method of operating a transportation refrigeration unit is provided. The method comprising: powering a compressor motor of a transportation refrigeration unit using an energy storage device; providing conditioned supply airflow to a cargo compartment using the transportation refrigeration unit; and regulating a temperature of the energy storage device using return airflow from the cargo compartment.

In addition to one or more of the features described above, or as an alternative, further embodiments may include that a selected amount of return airflow is diverted from the return air intake to the energy storage device to thermodynamically adjust the temperature of the energy storage device.

In addition to one or more of the features described above, or as an alternative, further embodiments may include that the energy storage device includes a battery system.

In addition to one or more of the features described above, or as an alternative, further embodiments may include that the selected amount of the return airflow is diverted around the energy storage device.

In addition to one or more of the features described above, or as an alternative, further embodiments may include that the selected amount of the return airflow is diverted through the energy storage device.

In addition to one or more of the features described above, or as an alternative, further embodiments may include: directing the selected amount of return airflow through the energy storage device and towards the evaporator heat exchanger using a barrier.

According to another embodiment, a computer program product tangibly embodied on a computer readable medium is provided. The computer program product including instructions that, when executed by a processor, cause the processor to perform operations comprising: powering a compressor motor of a transportation refrigeration unit using an energy storage device; providing conditioned supply airflow to a cargo compartment using the transportation refrigeration unit; and regulating a temperature of the energy storage device using return airflow from the cargo compartment.

Technical effects of embodiments of the present disclosure include utilizing return air from a transportation refrigeration unit to thermodynamically adjust the temperature of an energy storage device configured to power the transportation refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
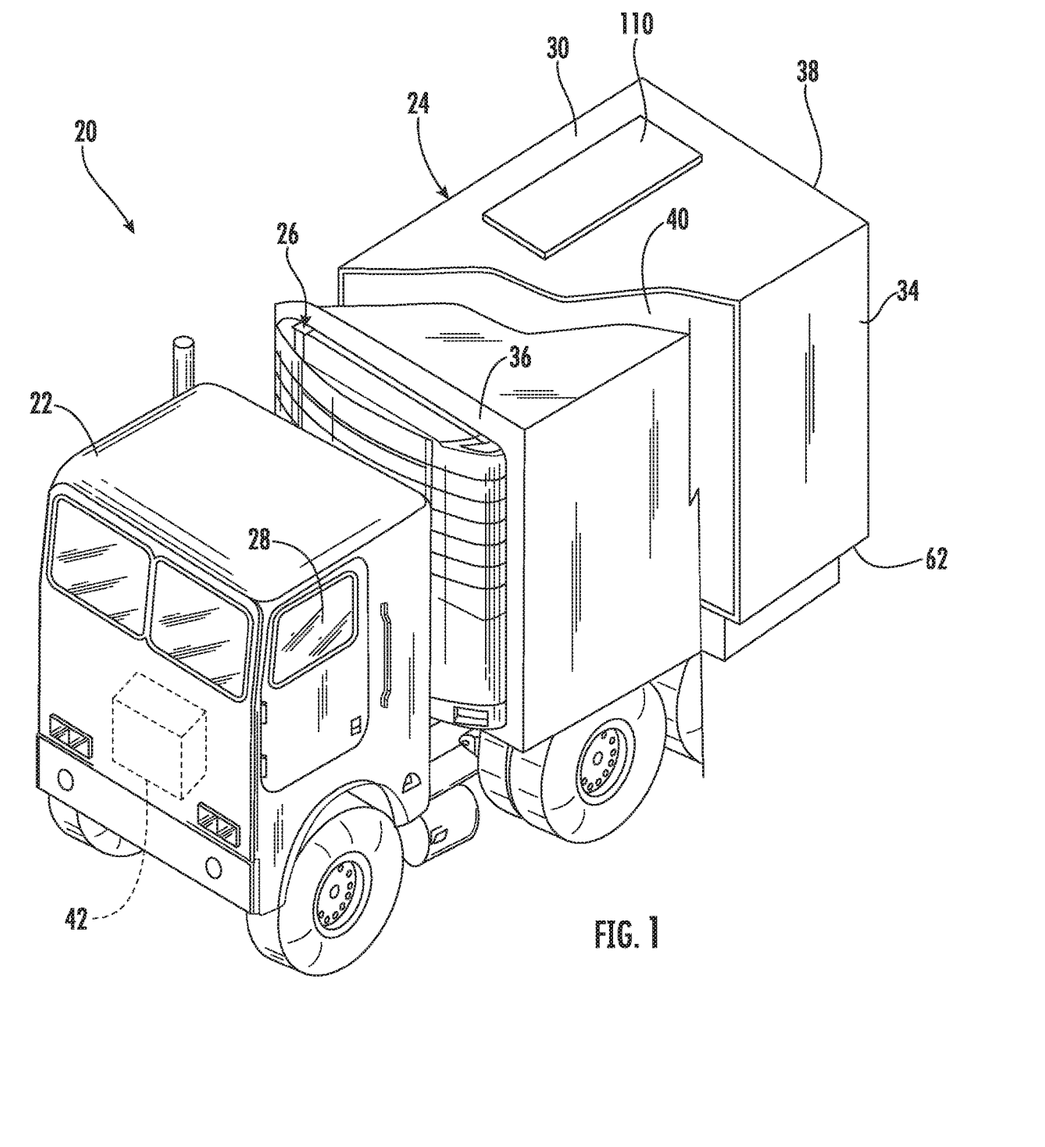
FIG. 1 is a perspective view of a transportation refrigeration system having an engineless transportation refrigeration unit as one, non-limiting, according to an embodiment of the present disclosure.

Referring to FIG. 1, a transport refrigeration system 20 of the present disclosure is illustrated. In the illustrated embodiment, the transport refrigeration systems 20 may include a tractor or vehicle 22, a container 24, and an engineless transportation refrigeration unit (TRU) 26. The container 24 may be pulled by a vehicle 22. It is understood that embodiments described herein may be applied to shipping containers that are shipped by rail, sea, air, or any other suitable container, thus the vehicle may be a truck, train, boat, airplane, helicopter, etc.

The vehicle 22 may include an operator's compartment or cab 28 and a combustion engine 42 which is part of the powertrain or drive system of the vehicle 22. The container 24 may be coupled to the vehicle 22 and is thus pulled or propelled to desired destinations. The trailer may include a top wall 30, a bottom wall 32 opposed to and spaced from the top wall 30, two side walls 34 spaced from and opposed to one-another, and opposing front and rear walls 36, 38 with the front wall 36 being closest to the vehicle 22. The container 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a container 24 to provide desired environmental parameters, such as, for example temperature, pressure, humidity, carbon dioxide, ethylene, ozone, light exposure, vibration exposure, and other conditions to the cargo compartment 40. In further embodiments, the TRU 26 is a refrigeration system capable of providing a desired temperature and humidity range.

Figure 2:
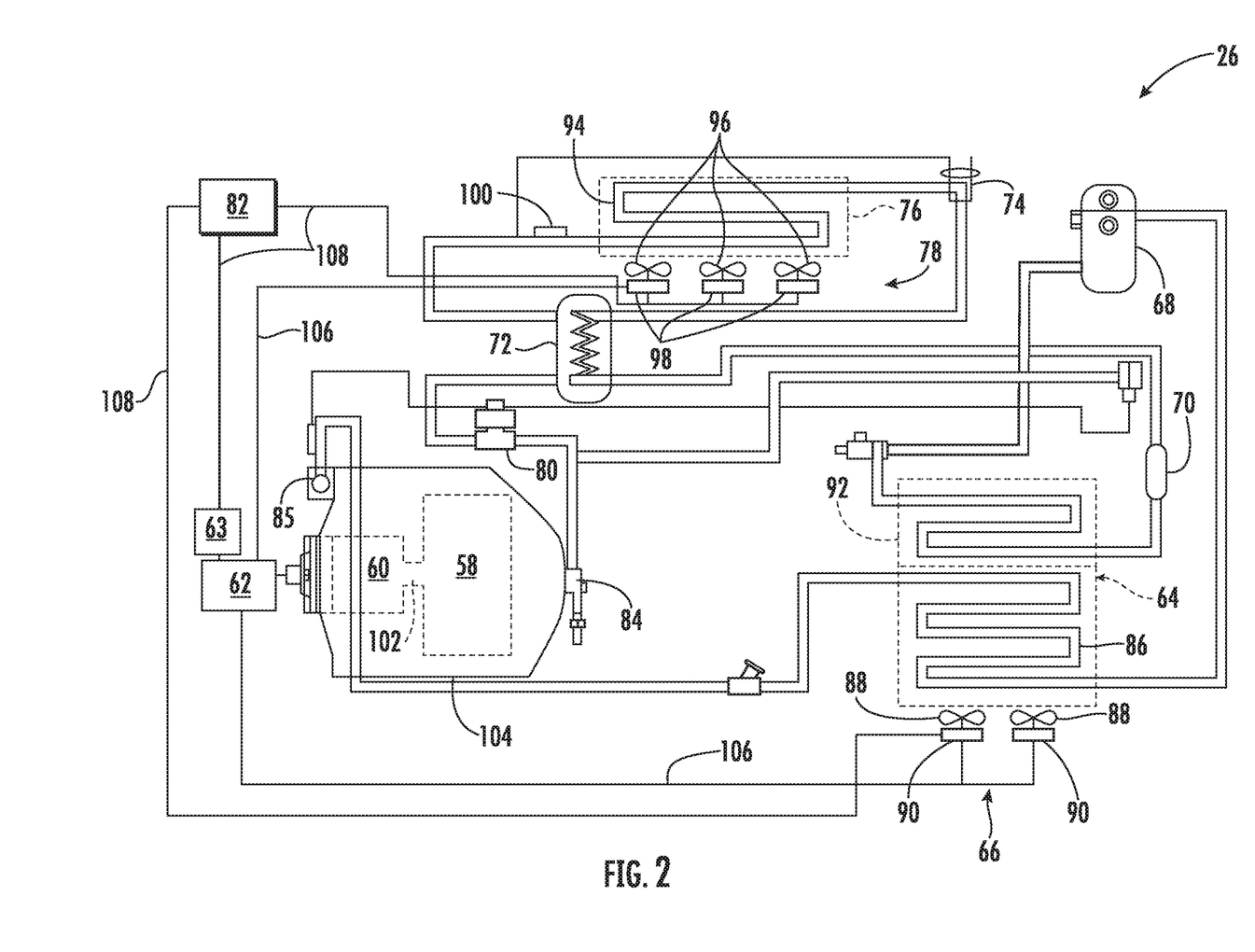
FIG. 2 is a schematic of the engineless transportation refrigeration unit, according to an embodiment of the present disclosure.

Referring to FIGS. 1 and 2, the container 24 is generally constructed to store a cargo (not shown) in the compartment 40. The engineless TRU 26 is generally integrated into the container 24 and may be mounted to the front wall 36. The cargo is maintained at a desired temperature by cooling of the compartment 40 via the TRU 26 that circulates airflow into and through the cargo compartment 40 of the container 24. It is further contemplated and understood that the TRU 26 may be applied to any transport compartments (e.g., shipping or transport containers) and not necessarily those used in tractor trailer systems. Furthermore, the transport container may be a part of the of the vehicle 22 or constructed to be removed from a framework and wheels (not shown) of the container 24 for alternative shipping means (e.g., marine, railroad, flight, and others).

The components of the engineless TRU 26 may include a compressor 58, an electric compressor motor 60, an electric energy storage device 62, a condenser 64 that may be air cooled, a condenser fan assembly 66, a receiver 68, a filter dryer 70, a heat exchanger 72, a thermostatic expansion valve 74, an evaporator 76, an evaporator fan assembly 78, a suction modulation valve 80, and a controller 82 that may include a computer-based processor (e.g., microprocessor). Operation of the engineless TRU 26 may best be understood by starting at the compressor 58, where the suction gas (e.g., natural refrigerant, hydro-fluorocarbon (HFC) R-404a, HFC R-134a . . . etc) enters the compressor at a suction port 84 and is compressed to a higher temperature and pressure. The refrigerant gas is emitted from the compressor at an outlet port 86 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric.

By removing latent heat, the gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the thermostatic expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Figure 3:
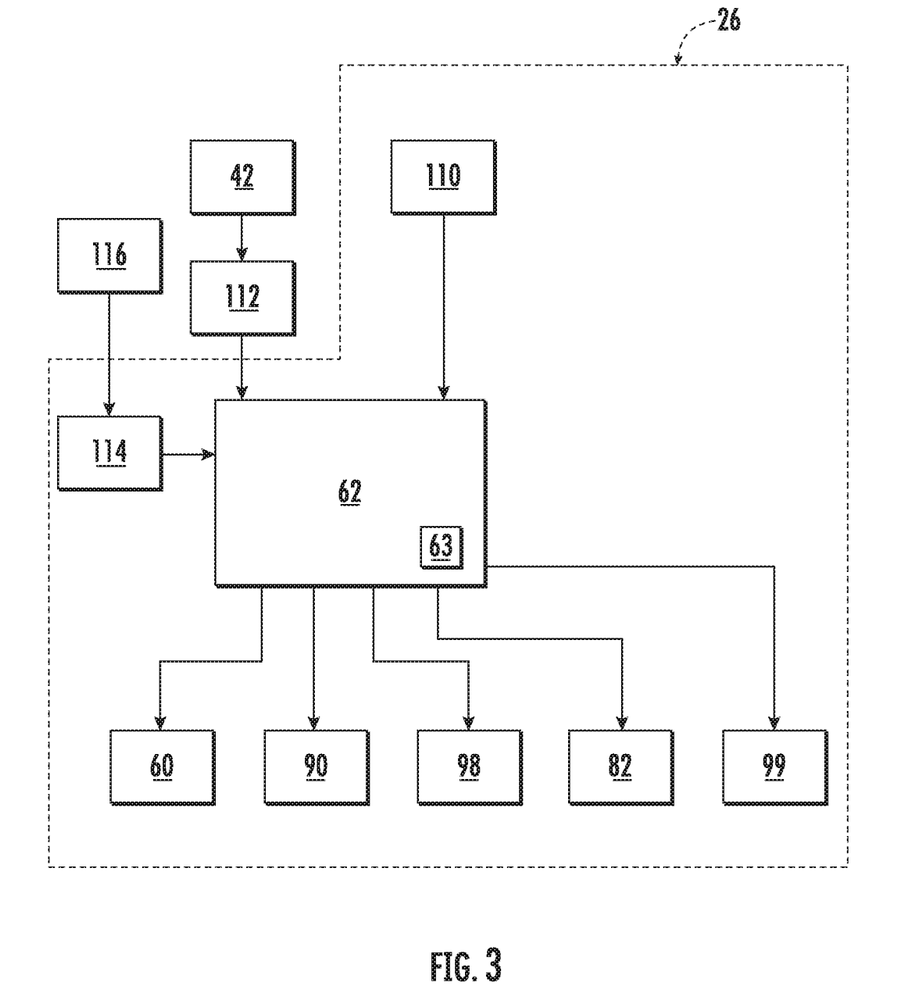
FIG. 3 is a block diagram of an energy storage device of the engineless transportation refrigeration unit and sources of power recharge, according to an embodiment of the present disclosure.

Referring to FIGS. 2 and 3, the energy storage device 62 may be configured to selectively power the compressor motor 60, the condenser fan motors 90, the evaporator fan motors 98, the controller 82, and other components 99 (see FIG. 3) that may include various solenoids and/or sensors) via, for example, electrical conductors 106. The controller 82 through a series of data and command signals over various pathways 108 may, for example, control the electric motors 60, 90, 98 as dictated by the cooling needs of the TRU 26. In one embodiment, the energy storage device 62 may be contained within the structure 27 of the TRU (see FIG. 4). The operation of the energy storage device 62 may be managed and monitored by an energy storage management system 63. The energy management system 63 is configured to determine a status of charge of the energy storage device 62, a state of health of the energy storage device 62, and a temperature of the energy storage device 62. Examples of the energy storage device 62 may include a battery system (e.g., a battery or bank of batteries), fuel cells, and others capable of storing and outputting electric energy that may be direct current (DC). The battery system may contain multiple batteries organized into battery banks through which cooling air may flow for battery temperature control, as described in U.S. patent application Ser. No. 62/616,077, filed Jan. 11, 2018, the contents of which are incorporated herein in their entirety.

The engineless TRU 26 may include a DC architecture without any of the components requiring alternate current (AC), or a mechanical form of power, to operate (i.e., the motors 60, 90, 98 may be DC motors). If the energy storage device 62 includes a battery system, the battery system may have a voltage potential within a range of about two-hundred volts (200 V) to about six-hundred volts (600 V). The use of these batteries may include a step-up or step-down transformer as needed (not shown). Generally, the higher the voltage, the greater is the sustainability of electric power which is preferred. However, the higher the voltage, the greater is the size and weight of, for example, batteries in an energy storage device 62, which is not preferred when transporting cargo. Additionally, if the energy storage device is a battery 62, then in order to increase either voltage and/or current, the batteries need to be connected in series or parallel depending upon electrical needs. Higher voltages in a battery energy storage device 62 will require more batteries in series than lower voltages, which in turn results in bigger and heavier battery energy storage device 62). A lower voltage and higher current system may be used, however such a system may require larger cabling or bus bars.

The engineless TRU 26 may further include a renewable power source 110 configured to recharge the batteries of the energy storage device 62. One embodiment of a renewable power source 110 may be solar panels mounted, for example, to the outside of the top wall 30 of the container 24 (also see FIG. 1). Another embodiment of a renewable power source 110 may include a regenerative braking system that derives electric power from the braking action of the wheels of the transport refrigeration system 20. An additional embodiment of a renewable power source 110 may include axle generators located in the axles of the transport refrigeration system 20 that are used to recover rotational energy when the transport refrigeration system 20 is in motion and convert that rotational energy to electrical energy, such as, for example, when the axle is rotating due to acceleration, cruising, or braking.

The combustion engine 42 of the vehicle 22 may further include an alternator or generator 112 for recharging the batteries 62. Alternatively or in addition to, the engineless TRU 26 may include a rectifier 114 and other components that facilitate recharging of the batteries 62 from an alternating current source 116 such as, for example, a remote power station or receptacle that receives power from a public utility grid.

Benefits of the present disclosure when compared to more traditional systems include lower fuel consumption, and a refrigeration unit that emits less noise and is lighter in weight. Yet further, the present disclosure includes an energy storage device that is conveniently and efficiently recharged to meet the power demands of the refrigeration unit.

Figure 4:
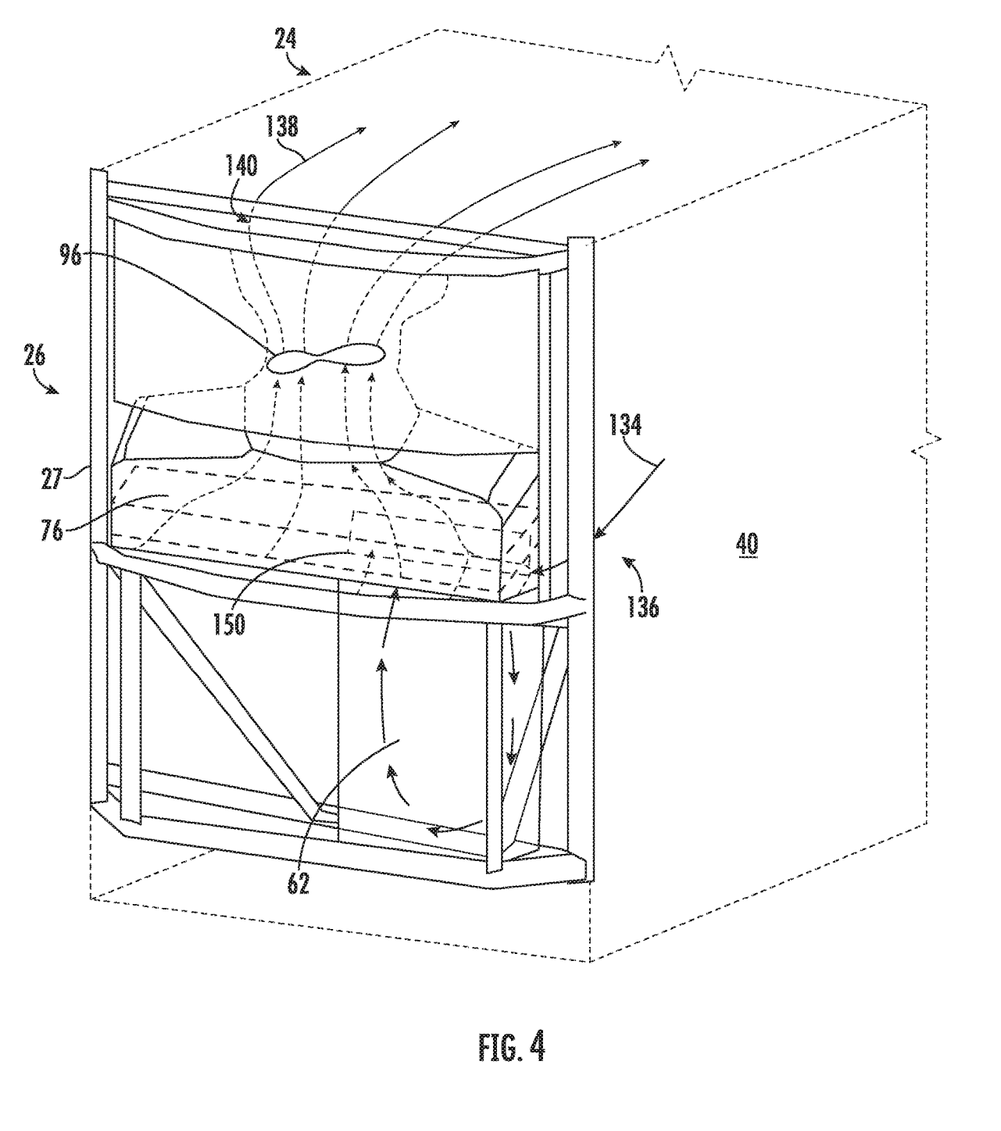
FIG. 4 is a perspective view of a transportation refrigeration unit, according to an embodiment of the present disclosure.

Referring now to FIGS. 4-8 with continued reference to FIGS. 1-3. FIG. 4 illustrates airflow through the TRU 26 and the cargo compartment 40. Airflow is circulated into and through the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

The return airflow 134 may be at a temperature relative lower than an air temperature outside of the cargo compartment 40 and may be diverted in order to cool the energy storage device 62 once the return airflow 134 has entered the return air intake 136. A regulating device 150 may be located proximate the return air intake 136 and configured to divert a selected amount of the return airflow 134 to the energy storage device 62. The selected amount of return airflow 134 thermodynamically adjusts the temperature of the energy storage device 62. For example, the selected amount of return airflow 134 may be utilized to reduce the temperature of the energy storage device 62 by absorbing heat. The regulating device 150 may adjust the selected amount of return airflow 134 diverted to the energy storage device 62 in real-time in response to a current temperature of the energy storage device 62. As shown in FIGS. 4-8, the selected amount of return airflow 134 is diverted to the air energy storage device 62 such that the selected amount of return airflow 134 is in thermal contact with the energy storage device 62. For example, the selected amount of return airflow 134 may be diverted through and/or around the energy storage device 62. The energy storage device 62 may include a barrier 162a-b inserted in the energy storage device 62, as seen in FIGS. 5-8. The barrier 162a-b is configured to separate the energy storage device 62 into at least two distinct paths including one path for return airflow 134 entering into the energy storage device 62 and the other path for return airflow exiting the energy storage device 62. The barrier 162a-b may be part of the energy storage device 62, as seen in FIGS. 5-8 or the barrier (i.e., divider baffle 152) may be external to the energy storage device 62 bypassing a selected amount of return airflow 134 to the energy storage device 62, as shown in FIG. 9 The barrier 162a-b is configured to direct the selected amount of return airflow 134 through the energy storage device 62 and upon exiting the energy storage device the bypassed return airflow mixes with the non-bypassed return air from the cargo compartment 40 before entering the evaporator 76 As seen in FIGS. 5-8, the barrier 162a-b may segment the energy storage device 62 into at least two compartments 67a-d and create a flow path for the selected amount of return airflow 134 to flow through the energy storage device 62.

Figure 5:
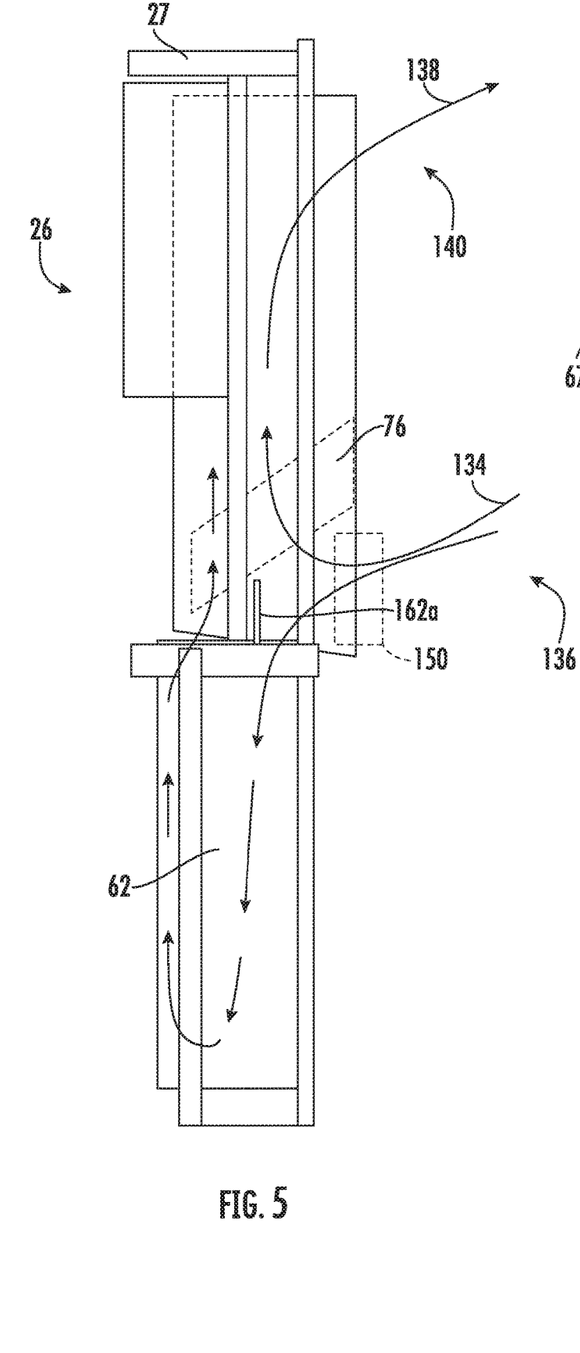
FIG. 5 is a cross-sectional side view of a transportation refrigeration unit, according to an embodiment of the present disclosure.
Figure 6:
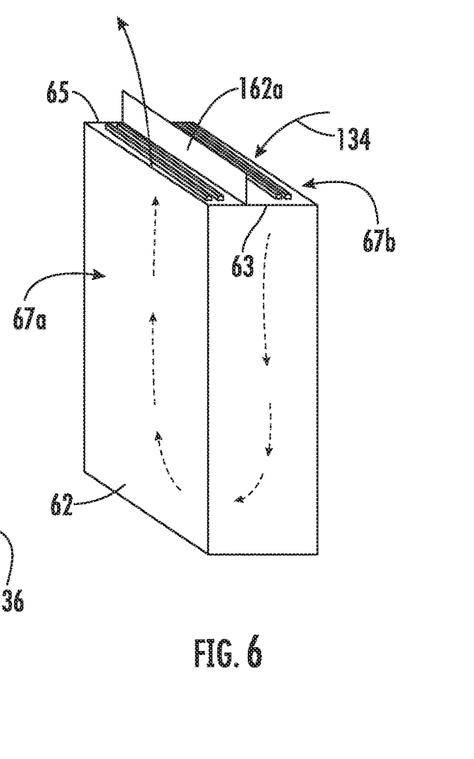
FIG. 6 is a perspective view of an energy storage device for a transportation refrigeration unit, according to an embodiment of the present disclosure.

FIGS. 5-6 illustrate a barrier 162a in a side-to-side orientation that stretches from a right-hand side 63 of the energy storage device 62 to a left-hand side 65 of the energy storage device 62. The barrier 162a separates the energy storage device 62 into two compartments 67a-b for the selected amount of return airflow 134 to flow through the energy storage device 62. The barrier 162a separates the energy storage device 62 into a front compartment 67a and a back compartment 67b. The front compartment 67a and is fluidly connected to the back compartment 67b. It is understood that there may be multiple barrier 162a to create more than two compartments within the energy storage device 62.

Figure 7:
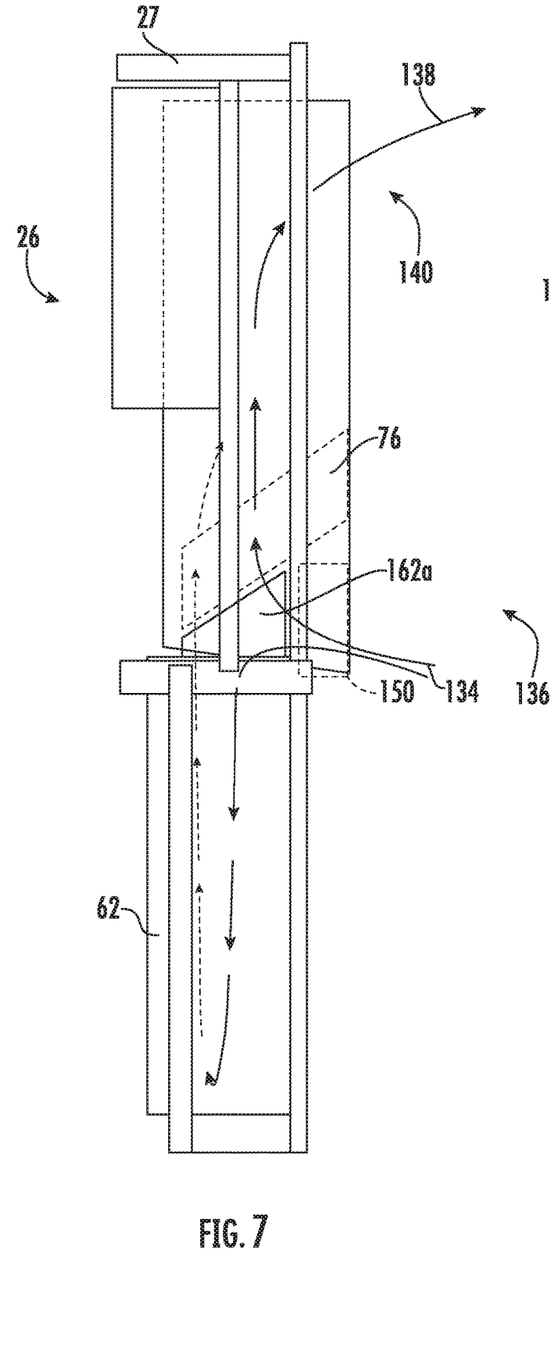
FIG. 7 is a cross-sectional side view of a transportation refrigeration unit, according to an embodiment of the present disclosure.
Figure 8:
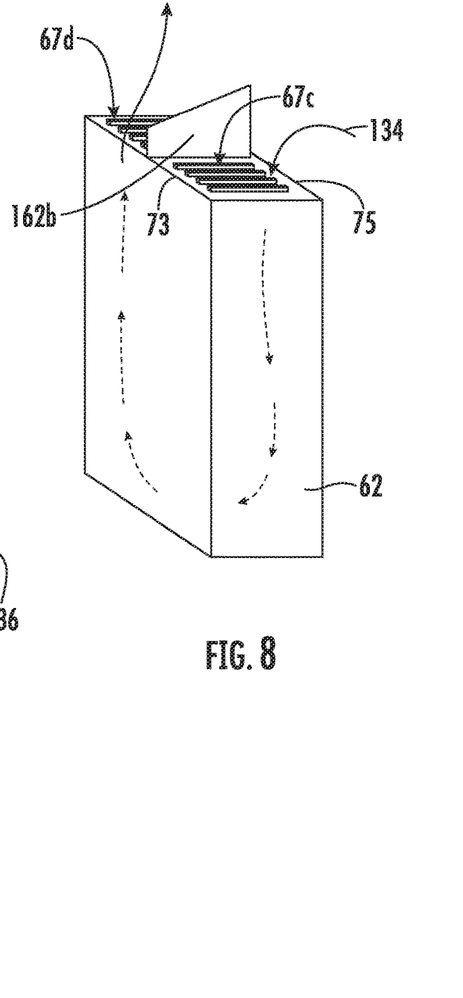
FIG. 8 is a perspective view of an energy storage device for a transportation refrigeration unit, according to an embodiment of the present disclosure.

FIGS. 7-8 illustrate a front-to-back barrier 162b that stretches from a front side 73 of the energy storage device 62 to a back side 75 of the energy storage device 62. The front-to-back barrier 162b separates the energy storage device 62 into two compartments 67c-d for the selected amount of return airflow 134 to flow through the energy storage device 62. The front-to-back barrier 162b separates the energy storage device 62 into a left-hand compartment 67c and a right hand compartment 67d. The left-hand compartment 67c and is fluidly connected to the right hand compartment 67d. It is understood that there may be multiple front-to-back barrier 162b to create more than two compartments 67c-d within the energy storage device 62. It is also understood that the embodiments disclosed herein are not limited to the side-to-side or front-to-back orientations of the barriers and the energy storage device 62 may contain any number of different barriers in different orientations.

Figure 9:
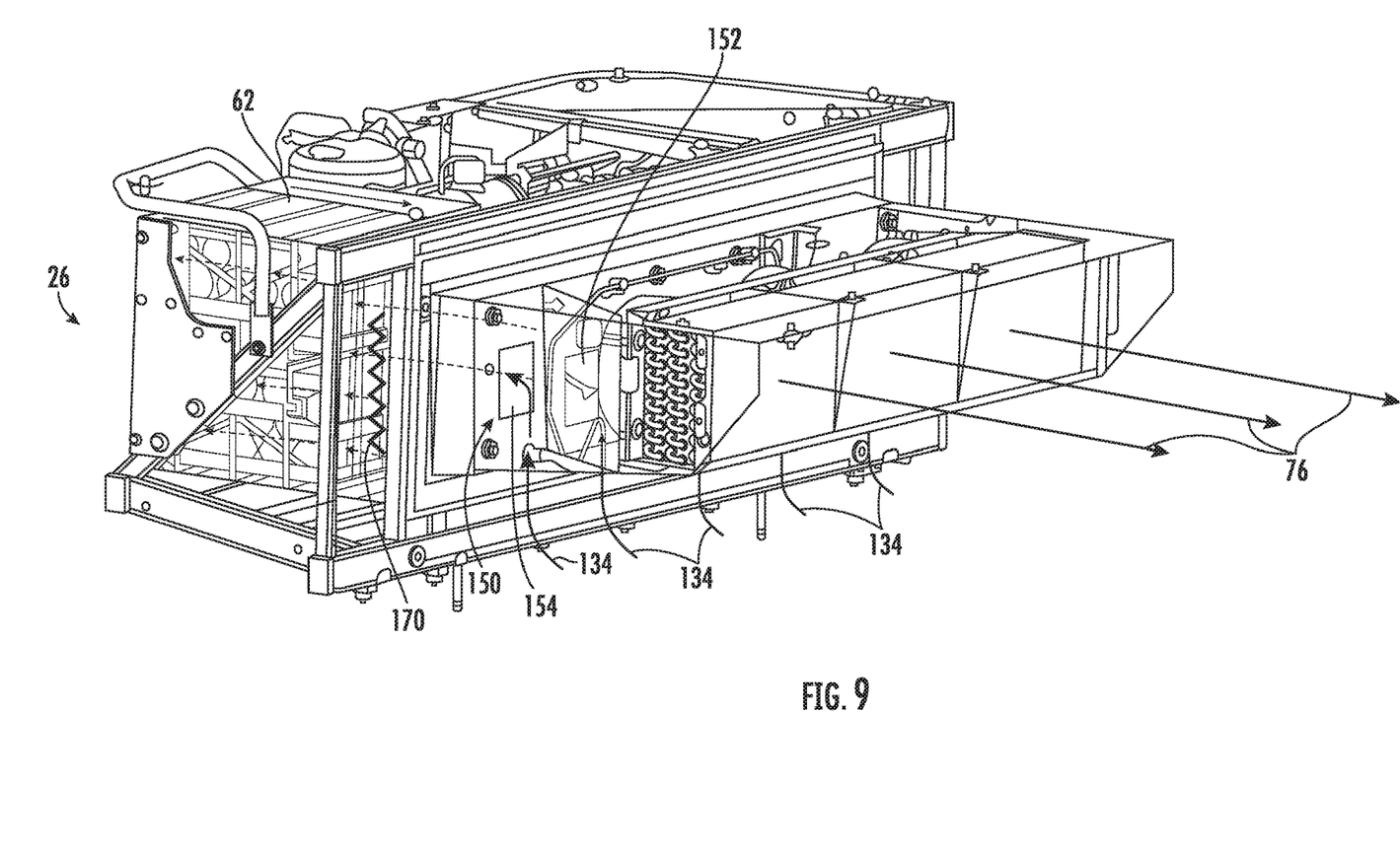
FIG. 9 is a perspective view of a transportation refrigeration unit, according to an embodiment of the present disclosure.

Referring now to FIG. 9 with continued reference to FIGS. 1-8. It is understood that embodiments disclosed herein may be incorporated on TRUs 26 other than the specific TRU 26 illustrated in FIGS. 1-8. For example, FIG. 9 illustrates a truck unit TRU 26 that diverts a selected amount of return airflow 134 to an energy storage device 62 within the truck unit TRU 26. In the embodiment illustrated in FIG. 9, the TRU 26 utilizes a regulating device 150 to divert a selected amount of the return airflow 134 to the energy storage device 62. The regulating device 150 in FIG. 9 is composed of a divider baffler 152 to split the return airflow 134 between the energy storage device 62 and the evaporator 76 and a flow adjustment device 154 to adjust the amount of airflow to the energy storage device 62. The divider baffler 152 is located upstream of the energy storage device 62 and configured to divert a selected amount of return airflow 134 through the energy storage device 62. The flow adjustment device 154 can include a control motor (i.e., a stepper motor) that would be used to fully open, partially open or fully close the flow openings depending upon the temperature setting inside the energy storage device 62. A temperature sensor (i.e., thermistor or RTD) can be placed in the air stream inside the energy storage device 62 and when the temperature rises above or below a pre-determined temperature setpoint defined in the TRU controller 82, the opening would be opened or closed accordingly. Additionally, a heating element 170 (e.g., electrical heater) can be placed in the airflow path to provide heat when the temperature setting is above one or more of the TRU controlling temperatures (e.g., Return Air Temperature and/or Ambient Air Temperature). In an embodiment, the heating element 170 is located in an airflow path of the selected amount of the return airflow being diverted from the regulating device 150, as seen in FIG. 9. In another embodiment, the heating element 170 may be placed inside the energy storage device 62. The flow adjustment device 154 may also include a booster fan to augment circulation into and out of the energy storage device 62. This operation of the booster fan could also be controlled based upon the temperature sensor located inside the energy storage device 62 through on/off or variable speed operation.

Figure 10:
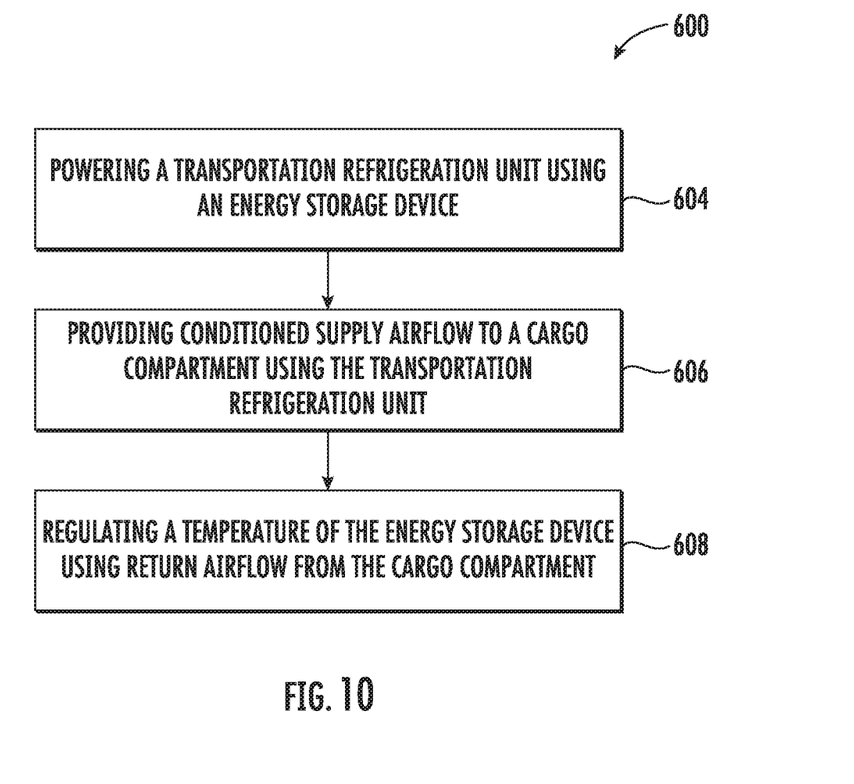
FIG. 10 is a flow diagram illustrating a method of operating a transportation refrigeration unit powered by an electric energy storage device, according to an embodiment of the present disclosure.

Referring now also to FIG. 10 with continued reference to FIGS. 1-9. FIG. 10 shows a flow diagram illustrating a method 600 of operating a TRU 26, according to an embodiment of the present disclosure. At block 604, the TRU 26 is powered using an energy storage device 62. At block 606, conditioned supply airflow 138 is provided to a cargo compartment 40 using the TRU 26. At block 608, a temperature of the energy storage device 62 is regulated using return airflow 134 from the cargo compartment 40.

While the above description has described the flow process of FIG. 10 in a particular order, it should be appreciated that unless otherwise specifically required in the attached claims that the ordering of the steps may be varied.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:
a container enclosing a cargo compartment;
a transportation refrigeration unit configured to provide supply airflow through a refrigeration unit outlet to the cargo compartment to cool a perishable good stored within the cargo compartment, wherein a return air flow is configured to exit the cargo compartment through a return air intake and re-enter the transportation refrigeration unit, the transportation refrigeration unit comprising:
a compressor configured to compress a refrigerant;
a compressor motor configured to drive the compressor;
an evaporator heat exchanger operatively coupled to the compressor;
an energy storage device for providing power to the compressor motor; and
an evaporator fan configured to provide the return airflow from the return air intake and flow the return airflow over the evaporator heat exchanger,
wherein the transportation refrigeration unit is configured to divert a selected amount of the return airflow from the return air intake to the energy storage device to regulate a temperature of the energy storage device,
wherein the selected amount of return airflow flows directly from the return air intake to the energy storage device without flowing through the evaporator heat exchanger between the return air intake and the energy storage device,
wherein the transport refrigeration unit is configured to direct the selected amount of the return airflow to the evaporator heat exchanger after the selected amount of the return airflow regulates the temperature of the energy storage device,
wherein the selected amount of the return airflow flows directly from the energy storage device to the evaporator heat exchanger without flowing into the cargo compartment between the energy storage device and the evaporator heat exchanger, and
wherein the transportation refrigeration unit further comprises:
a regulation device located proximate the return air intake and configured to divert the selected amount of the return airflow directly to the energy stooge device and direct a remainder of the return airflow directly to the evaporator heat exchanger without passing through the cargo compartment, the energy storage device, or outside of the transportation refrigeration unit.

2. The transport refrigeration system of claim 1, wherein the energy storage device includes a battery system.

3. The transport refrigeration system of claim 1, wherein the selected amount of the return airflow is diverted around the energy storage device.

4. The transport refrigeration system of claim 1, wherein the selected amount of the return airflow is diverted through the energy storage device.

5. The transport refrigeration system of claim 1, wherein the transportation refrigeration unit further comprises:
a barrier configured to direct the selected amount of the return airflow through the energy storage device and towards the evaporator heat exchanger.

6. The transport refrigeration system of claim 5, wherein the barrier divides the energy storage device into at least two compartments.

7. The transport refrigeration system of claim 5, wherein the energy storage device includes a right-hand side and a left-hand side, and the barrier stretches from the right-hand side of the energy storage device to the left-hand side of the energy storage device.

8. The transport refrigeration system of claim 5, wherein the energy storage device includes a front side and a back side, and the barrier stretches from the front side of the energy storage device to the back side of the energy storage device.

9. The transport refrigeration system of claim 5, wherein the barrier is located upstream of the energy storage device.

10. The transport refrigeration system of claim 4, further comprising:
a flow adjustment device to adjust the selected amount of the return airflow to the energy storage device using at least one of a controller and a booster fan.

11. The transport refrigeration system of claim 1, further comprising:
a heating element located in an airflow path of the selected amount of the return airflow being diverted from the regulating device.

12. A method of operating a transportation refrigeration unit of a transport refrigeration system, the method comprising:
powering a compressor motor of the transportation refrigeration unit using an energy storage device;
providing conditioned supply airflow to a cargo compartment using the transportation refrigeration unit, wherein the transportation refrigeration unit is configured to provide supply airflow through a refrigeration unit outlet to the cargo compartment to cool a perishable good stored within the cargo compartment, wherein a return air flow is configured to exit the cargo compartment through a return air intake and re-enter the transportation refrigeration unit;
regulating a temperature of the energy storage device using the return airflow from the cargo compartment, by diverting a selected amount of the return airflow from the return air intake to the energy storage device using a regulating device located proximate the return air intake;
directing, using the regulating device, a remainder of the return airflow directly to the evaporator heat exchanger without passing through the cargo compartment, the energy storage device, or outside of the transportation refrigeration unit, and
wherein the selected amount of return airflow flows directly from the return air intake to the energy storage device without flowing through an evaporator heat exchanger between the return air intake and the energy storage device,
wherein the selected amount of the return airflow is directed to the evaporator heat exchanger after regulating the temperature of the energy storage device,
wherein the selected amount of the return airflow flows directly from the energy storage device to the evaporator heat exchanger without flowing into the cargo compartment between the energy storage device and the evaporator heat exchanger.

13. The method of claim 12, wherein the energy storage device includes a battery system.

14. The method of claim 12, wherein the selected amount of the return airflow is diverted around the energy storage device.

15. The method of claim 12, wherein the selected amount of the return airflow is diverted through the energy storage device.

16. The method of claim 12, further comprising:
directing the selected amount of the return airflow through the energy storage device and towards the evaporator heat exchanger using a barrier.

17. A computer program product tangibly embodied on a non-transitory computer readable medium, the computer program product including instructions that, when executed by a processor, cause the processor to perform operations comprising:
powering a compressor motor of a transportation refrigeration unit of a transport refrigeration system using an energy storage device;
providing conditioned supply airflow to a cargo compartment using the transportation refrigeration unit, wherein the transportation refrigeration unit is configured to provide supply airflow through a refrigeration unit outlet to the cargo compartment to cool a perishable good stored within the cargo compartment, wherein a return air flow is configured to exit the cargo compartment through a return air intake and re-enter the transportation refrigeration unit; and
regulating a temperature of the energy storage device using the return airflow from the cargo compartment by:
diverting, using a regulating device located proximate the return air intake, a selected amount of the return airflow from the return air intake to the energy storage device to regulate the temperature of the energy storage device, wherein the selected amount of return airflow flows directly from the return air intake to the energy storage device without flowing through the evaporator heat exchanger between the return air intake and the energy storage device
directing, using the regulating device, a remainder of the return airflow directly to the evaporation heat exchanger without passing through the cargo compartment, the energy storage device, or outside of the transportation refrigeration unit; and
adjusting the selected amount of the return airflow with a flow adjustment device using at least one of a controller and a booster fan,
wherein the selected amount of the return airflow is directed to an evaporator heat exchanger after regulating the temperature of the energy storage device,
wherein the selected amount of the return airflow flows directly from the energy storage device to the evaporator heat exchanger without flowing into the cargo compartment between the energy storage device and the evaporator heat exchanger.

18. The transport refrigeration system of claim 1, wherein the supply airflow is provided directly from the evaporator heat exchanger to the refrigeration unit outlet without flowing to the energy storage device between the evaporator heat exchanger and the refrigerator unit outlet.

19. The method of claim 12, wherein the supply airflow is provided directly from the evaporator heat exchanger to the refrigeration unit outlet without flowing to the energy storage device between the evaporator heat exchanger and the refrigerator unit outlet.

20. The computer program product of claim 17, wherein the supply airflow is provided directly from the evaporator heat exchanger to the refrigeration unit outlet without flowing to the energy storage device between the evaporator heat exchanger and the refrigerator unit outlet.

* * * * *